R. N. INK.
SEGMENTAL CASING FOR TIRES.
APPLICATION FILED SEPT. 9, 1921.
1,399,430.
Patented Dec. 6, 1921.
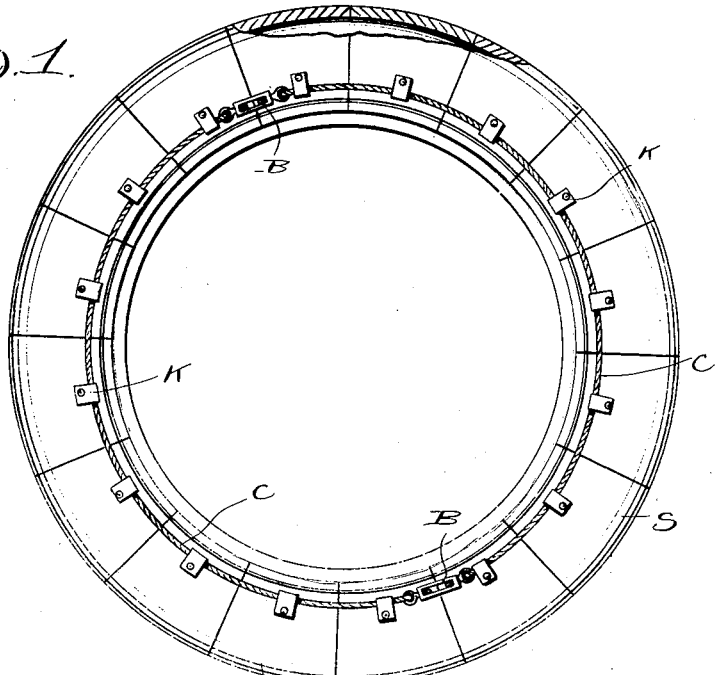
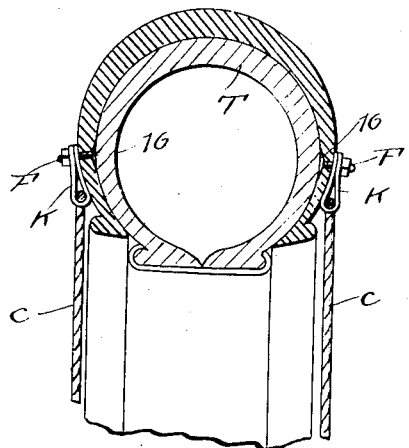
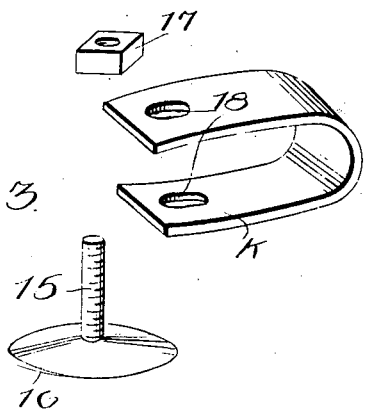
WITNESSES
INVENTOR
R. N. INK,
BY
ATTORNEYS

UNITED STATES PATENT OFFICE.

ROLLA N. INK, OF SAN DIEGO, CALIFORNIA.

SEGMENTAL CASING FOR TIRES.

1,399,430.  Specification of Letters Patent.  Patented Dec. 6, 1921.

Application filed September 9, 1921. Serial No. 499,477.

*To all whom it may concern:*

Be it known that I, ROLLA N. INK, a citizen of the United States, and a resident of San Diego, in the county of San Diego and State of California, have invented certain new and useful Improvements in Segmental Casings for Tires, of which the following is a specification.

My invention relates to pneumatic tires and particularly to casings therefor, a purpose of my invention being the provision of a tire casing supplemental to the ordinary tire casing and adapted to be super-imposed thereon when the latter is unduly worn or punctured, and to thus, in effect, provide a new casing for the tire.

It is also a purpose of my invention to provide a supplemental tire casing made up of a multiplicitiy of segmental sections held in embracing position with respect to the ordinary tire casing so as to prevent creeping thereof and at the same time to allow the ready removal of any one section independently of the other so that should any one section become unduly worn a new one can be substituted without the necessity of removing all of the sections.

I will describe one form of supplemental tire casing embodying my invention and will then point out the novel features thereof in claims.

In the accompanying drawing:

Figure 1 is a view showing in side elevation a pneumatic tire having applied thereto one form of supplemental tire casing embodying my invention.

Fig. 2 is a vertical sectional view of a portion of the pneumatic tire and supplemental casing shown in Fig. 1.

Fig. 3 is an enlarged detail perspective view of one of the fastening members comprised in the supplemental tire casing shown in the preceding views.

Similar reference characters refer to similar parts in each of the views.

Referring specifically to the drawings, my invention in its present embodiment comprises a casing consisting of a multiplicity of segmental sections S, each of which is preferably formed from a portion of an old tire casing thus rendering the formation of the casing extremely inexpensive. For attaching the several sections of the casing in embracing position with respect to a tire, two fastening members F are provided for each of the sections, each of which comprises a screw threaded shank 15 having a relatively large disk shaped head 16 formed on one end thereof, and a nut 17 threadedly fitted on the shank. A connecting member K is mounted on the shank 15 and retained thereon by means of the nut 17, this member comprising a single length of metal bent in the form of a U and having openings 18 adjacent its ends to accommodate the shank 15. When the member K is in applied position it provides a loop through which an attaching cable C is adapted to extend.

In the applied position of the two fastening members F of any one section, they are arranged at diametrically opposed points on the sections as clearly shown in Fig. 2, with the shanks 15 extending through the sections so that the heads 16 are disposed between the section and the tire casing T of the tire. The members K are mounted upon the projecting ends of the shank 15 so that with the nuts 17 applied, the members are securely held upon the outer side of the section and at points adjacent the clencher B of the section.

With the fastening members arranged as just described, four cables C are extended through the loops provided by the members K, and the confronting ends of these cables are formed with turn-buckles B by means of which the cables can be drawn together and to thereby effect the pulling of all of the sections toward the axis of the casing. In this manner the several sections of the supplemental casing are caused to firmly embrace the tire casing T and to thereby be held against creeping upon the casing.

If it is desired to remove any one of the sections S comprised in the supplemental casing, this can be readily accomplished by removing the nuts 17 of the corresponding section whereby the members K can be slipped from the shanks and the section removed.

What I claim is:

1. A supplemental tire casing comprising a multiplicity of segmental sections arranged end to end and in contact with each other, fastening members carried by the sections, each fastening member comprising a threaded shank extending through one wall of the section, a head formed on the inner end of the shank, a connecting member removably secured on the shank and formed to provide a loop, cables extending through the loops, and means at the ends of the cables for drawing the latter together.

2. A supplemental tire casing comprising a multiplicity of segmental sections arranged end to end and in contacting relation to each other, fastening members arranged at diametrically opposed points on each of the sections, each fastening member comprising a shank extending through one wall of the section, means for confining the shank of the section, a connecting member removably carried by the shank, cables extending through the connecting members, and turn-buckles at the ends of the cables for the purpose described.

ROLLA N. INK.